United States Patent [19]

Varga, Jr.

[11] 3,793,081

[45] Feb. 19, 1974

[54] SULFIDED TRANSITION METAL FUEL CELL CATHODE CATALYSTS

[75] Inventor: Gideon M. Varga, Jr., Hohokus, N.J.

[73] Assignee: Esso Research and Engineering Company, Linden, N.J.

[22] Filed: Apr. 28, 1971

[21] Appl. No.: 138,282

Related U.S. Application Data

[63] Continuation-in-part of Ser. No. 820,678, April 30, 1969, abandoned.

[52] U.S. Cl. .............. 136/86 D, 136/86 E, 252/439
[51] Int. Cl. .......................................... H01m 27/04
[58] Field of Search .......... 136/86; 23/134; 252/439

[56] References Cited
UNITED STATES PATENTS

| 3,480,479 | 11/1969 | Nestor | 252/439 X |
| 3,160,528 | 12/1964 | Dengler et al. | 136/86 C |
| 3,528,857 | 9/1970 | Lieb et al. | 136/86 D |
| 2,770,527 | 11/1956 | Alderson et al. | 23/134 |

FOREIGN PATENTS OR APPLICATIONS

| 900,451 | 7/1962 | Great Britain | 136/86 D |
| 1,250,792 | 9/1967 | Germany | 252/439 |

Primary Examiner—A. B. Curtis

[57] ABSTRACT

An improved electrochemical cell has an acid electrolyte and a catalytic amount of at least one acid insoluble sulfide of a transition metal in the cathode. The preferred cathode catalyst is a mixture of a transition metal disulfide and thio spinel.

5 Claims, No Drawings

SULFIDED TRANSITION METAL FUEL CELL CATHODE CATALYSTS

CROSS REFERENCES

This application is a continuation-in-part of copending application Ser. No. 820,678, filed Apr. 30, 1969, now abandoned.

BACKGROUND OF THE INVENTION

1. Field of the Invention

The present invention concerns non-noble metal electrocatalysts. More particularly, this invention relates to non-noble metal sulfided catalysts for cathode electrodes in fuel cells employing acid electrolytes. In particular, it concerns the use of certain acid insoluble sulfides and mixtures of sulfides of a transition metal for the cathodic reduction of an oxidant in a fuel cell.

2. Description of the Prior Art

As used herein, the term "electrochemical cells" refers both to fuel cells and electrolytic cells.

The term "fuel cell" is used herein and in the art to denote a device, system or apparatus wherein the chemical energy of a fluid (i.e. gaseous or liquid) combustible fuel, e.g. hydrogen, carbon monoxide, a hydrocarbon or a substituted hydrocarbon containing hydrogen in its molecular structure, is electrochemically converted to electrical energy at a non-sacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a fluid fuel into contact with the anode and electrolyte and means for admitting a fluid oxidant into dual contact with the cathode and electrolyte. When necessary or desired, the electrolyte compartment is divided into an anolyte compartment and a catholyte compartment, e.g. by an ion-permeable partition or ion-exchange membrane. Thus, in each such fuel cell, a fluid fuel is passed to the anode and there oxidized electrochemically, giving up electrons to the anode, while a fluid oxidant is passed to the cathode and there reduced upon receiving electrons from such cathode.

The term "electrolytic cell" is used herein and in the art to denote a device, system or apparatus which, unlike the aforementioned fuel cell, does not provide a net production of electrical energy but does provide for the anodic oxidation of an organic fuel at the anode of the cell. In such cells a direct current of electrical energy from an external source, e.g. a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g. conversion of alcohols to ketones, hydrocarbons to carboxylic acids, etc.

In most of the cells of the type hereinbefore described, catalysts are employed to promote the reactions within the cell. The term "cathodic reduction catalysts" is employed herein to include catalysts which are associated with the cathode reaction, e.g. oxygen reduction, of an electrochemical cell. The term "anodic oxidation catalysts" is employed herein to include catalysts which are associated with the anode reaction, i.e. oxidation of a combustible fuel, of an electrochemical cell. These catalysts usually are an integral part of the cathode or anode but in some applications the catalysts are not a part of the electrode. For example, the catalysts may be employed in the form of an electrolyte slurry.

In addition to exhibiting electrode catalytic activity, a material to be suitable for use as such a catalyst in an electrochemical cell must also exhibit certain other properties. For example, the material must be electrically conductive and in addition must be resistant to attack from the electrolyte within the cell. Many cells employ acidic electrolytes, since such electrolytes reject carbon dioxide, and thus the material which is conductive and catalytic must also be resistant to acid corrosion in order for the material to be a suitable cathodic reduction catalyst.

SUMMARY OF THE INVENTION

According to the present invention an improved fuel cell is provided, having in combination, an acid containing electrolyte and a cathode catalyst of at least one acid insoluble sulfide of a transition metal.

The term "transition metal" is used herein to represent any one of the members of groups IVB, VB, VIB, VIIB, VIII and IB of the Periodic Table such as iron, cobalt, nickel, molybdenum and tungsten. The Periodic Table referred to is that described in "The Encyclopedia of Chemistry," Reinhold Publishing Corporation, 2nd Edition (1966) at page 790.

One or more acid insoluble sulfides of a transition metal can be used as the cathode catalyst of this invention. When one sulfide is used, preferably it is a disulfide such as $MoS_2$, $WS_2$, $FeS_2$, $CoS_2$ and $NiS_2$. When more than one sulfide is used, preferably it is a mixture of a disulfide and a thio spinel. Illustrative of such mixtures are $CoS_2$ and $Co_3S_4$, $FeS_2$ and $Fe_3S_4$, and the like.

It has been found that these catalysts are effective in acid media such as sulfuric acid, phosphoric acid and the like. In particular a mixture of $CoS_2$ and $Co_3S_4$ is especially effective.

The catalysts of the invention are prepared by well-known techniques. A specific procedure that has been found to give good result is as follows: a monosulfide, sulfate or oxide of the transition metal, e.g. NiS, $NiSO_4$, CoS, $CoSO_4$, $Co_3O_4$, FeS, $FeSO_4$, $Fe_2O_3$, $MoO_3$, etc., is heated in the presence of hydrogen sulfide gas at a moderate temperature, e.g. 250° to 690°C., for about 2 to 7 hours. The resultant sulfided metal catalyst is then heated in an inert atmosphere, e.g. nitrogen or argon, to above 445°C., e.g. 450° to 690°C, in order to volatilize any uncombined sulfur. As is known, depending upon the time and temperature of heating, various mixtures of disulfide and thio spinel can be formed from the metal spinel by this procedure. Thus, when the spinel $Co_3O_4$ is heated as described in $H_2S$, $CoS_2$ and $Co_3S_4$ are produced. Active sulfided catalysts can also be prepared by heating a mixture of the elements contained in an evacuated quartz ampoule.

Electrodes containing the catalyst of the invention may also be prepared in a conventional manner. In general, an electrode may be prepared by compressing the sulfide of the transition metal into a conductive support material such as a metal screen. A convenient method is to mix a desired sulfided metal powder with an aqueous emulsion containing 5 to 10 percent by weight polytetrafluoroethylene, e.g. Teflon, at ambient temperatures and applying the resulting paste to a tantalum screen current collector. The electrode may then be formed by pressing at room temperature and 1,000 psi and then by pressing at 330°C. and 1,100 psi.

The following examples demonstrate the effectiveness of the combination of acid electrolyte and cathode catalyst of this invention.

DESCRIPTION OF THE PREFERRED EMBODIMENTS

EXAMPLE 1

Electrodes containing the disulfides of iron, cobalt, nickel, molybdenum or tungsten were prepared in the following manner.

One gram of the metal disulfide powder was mixed at room temperature with sufficient Teflon 42 (du Pont trademark) aqueous emulsion to produce a 10 percent by weight Teflon paste. The resulting paste was then applied to both sides of a 50 mesh tantalum screen. The coated screen was then pressed at room temperature in a hydraulic press at 1,000 psi for about 10 seconds and then at 330°C. and 1,100 psi for about 1 minute. The electrode area was about 5.4 square centimeters.

EXAMPLE 2

The electrodes as prepared in Example 1 were tested as cathodes by employing oxygen gas in contact therewith in a half cell containing 30 wt. percent sulfuric acid maintained at a temperature of about 90°C. The following data were obtained using a standard Calomel reference electrode.

OPEN CIRCUIT POTENTIALS OF DISULFIDE ELECTRODES WITH $O_2$ AND $N_2$ AT 90°C. IN 30% $H_2SO_4$

| Catalyst | Volts vs. Reversible Oxygen Potential | Gas[1] |
|---|---|---|
| $NiS_2$ | 0.53 | $O_2$ |
| $NiS_2$ | 0.73 | $N_2$ |
| $CoS_2$ | 0.57 | $O_2$ |
| $CoS_2$ | 0.88 | $N_2$ |
| $FeS_2$ | 0.63 | $O_2$ |
| $FeS_2$ | 0.86 | $N_2$ |

[1] Flow rate of ~ 30 cc./min.

EXAMPLE 3

A mixture of $CoS_2$ and $Co_3S_4$ was prepared by heating the spinel $Co_3O_4$ in a flowing stream of $H_2S$ at 600°C. for 7 hours. The resultant intimate mixture of $CoS_2$ and $Co_3S_4$ was identified by X-ray powder diffraction techniques. Then an electrode containing the mixture of cobalt disulfide and cobalt thio spinel was prepared according to the procedure outlined in Example 1.

Thereafter the electrode prepared was tested following the method of Example 2 except the cell temperature was maintained at 60°C. The results of this test are compared in the following table with data obtained for $CoS_2$ and $NiS_2$ in the preceding examples.

OPEN CIRCUIT POTENTIAL OF CATALYST MIXTURE COMPARED WITH DISULFIDE ALONE

| Catalyst | Cell Temperature °C. | Volts vs. Reversible Oxygen Potential |
|---|---|---|
| $CoS_2 + Co_3S_4$ | 60° | .48 |
| $CoS_2$ | 90° | .57 |
| $NiS_2$ | 90° | .53 |

It is interesting to note that the mixture of sulfides is superior to the disulfides alone.

It is to be understood that the examples presented herein are intended to merely be illustrative of the invention and not as limiting it in any manner; nor is the invention to be limited by any theory regarding its operability. The scope of the invention is to be determined by the appended claims.

What is claimed is:

1. A fuel cell having a housing; anode and cathode electrodes having catalyst material associated therewith mounted in said housing in spaced relation to each other; means for supplying fuel to the anode and means for supplying an oxidant to the cathode; the improvement wherein said electrolyte is an acid containing electrolyte and the catalytic material associated with said cathode is a mixture of a disulfide and a thio spinel of the same transition metal.

2. The fuel cell of claim 1 wherein said transition metal is cobalt.

3. In the method of generating electric power in a fuel cell by electrochemically reacting a fuel and an oxidant at the anode and cathode, the improvement which comprises in combination supplying an acid electrolyte to said cell and providing said cathode with at least a catalytic amount of a disulfide and thio spinel of the same transition metal.

4. The method of claim 3 wherein said cathode is provided with a disulfide of a transition metal.

5. The method of claim 3 wherein the transition metal is cobalt.

* * * * *